Nov. 7, 1950  V. W. YOST  2,528,808
VARIABLE MOLD FOR FORMING CORK INSULATION
Filed Dec. 19, 1945
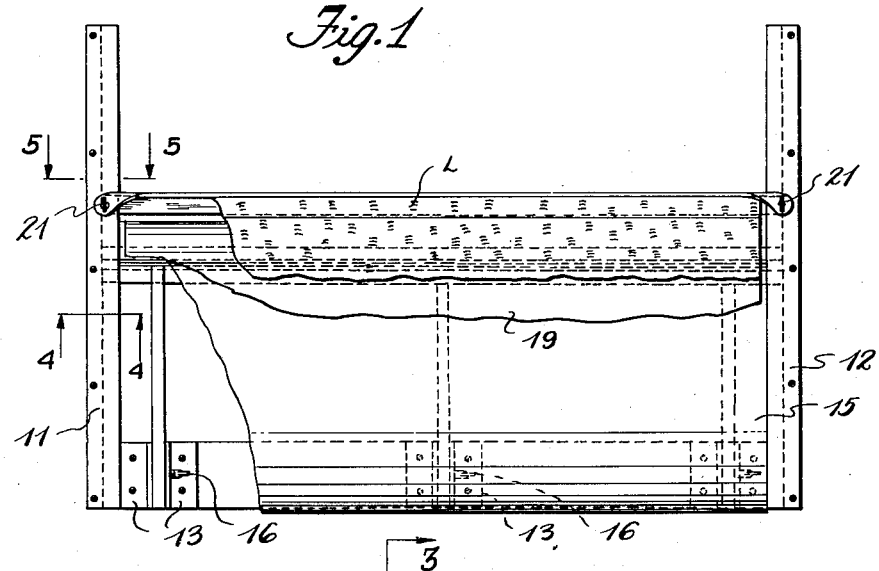
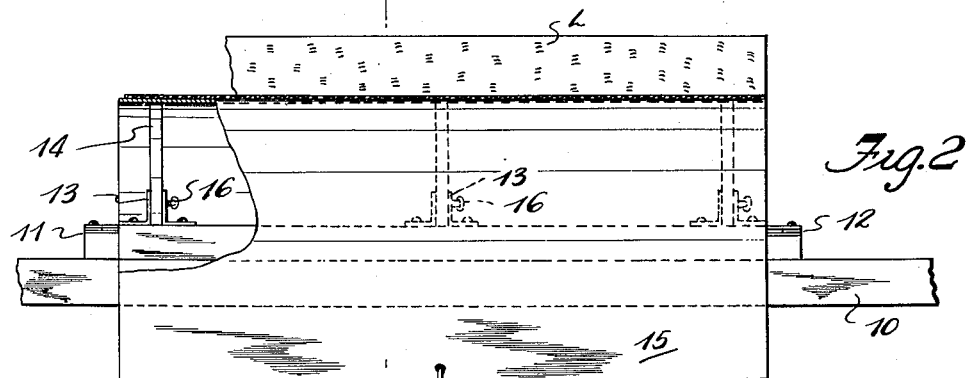
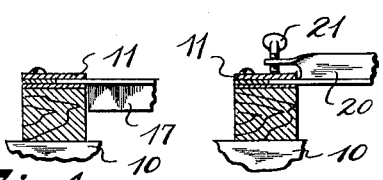
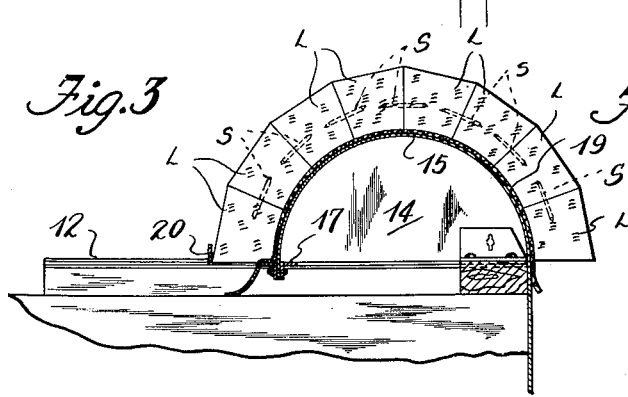
Inventor
VINCENT WILLIAM YOST
By Hazard & Miller
Attorneys Patented Nov. 7, 1950

2,528,808

UNITED STATES PATENT OFFICE 2,528,808

VARIABLE MOLD FOR FORMING CORK INSULATION

Vincent William Yost, Lynwood, Calif.

Application December 19, 1945, Serial No. 635,978

3 Claims. (Cl. 154—27)

This invention relates to a variable mold for forming semi-cylindrical sections of lagging and the like, such as is employed for covering steam pipes or other conduits conducting heated or cooled fluids.

In the construction of such lagging it has been found expedient to assemble together a plurality of cork lagging strips or lags. These lags may be coated on their contiguous sides with asphaltum or a similar adhesive and are assembled together in side by side relationship to form an arcuate or semi-cylindrical section of lagging. These semi-cylindrical sections as thus produced may be suitably trimmed if found necessary and are then assembled about the pipe or conduit that is to be insulated to form the complete lagging therefor.

The internal radius of curvature of the semi-cylindrical lagging section must, of course, conform to the external radius of curvature of the pipe or conduit that is to be insulated and as there are a multitude of sizes of pipes or conduits that may require insulation a corresponding number of different sizes of molds or shaping devices on which the lags might be assembled would ordinarily be required.

An object of the present invention is to provide a variable mold or forming device on which lags of insulating material may be assembled and which is so designed that it may be easily and quickly varied or adjusted to present a radius of curvature conforming to any ordinary sizes of pipe that is to be insulated. Thus, for a given size of pipe the mold or forming device may be adjusted to conform thereto and the lags assembled together about the mold or forming device to produce a semi-cylindrical lagging section that will properly fit the pipe.

More specifically, an object of the invention is to provide a mold or forming device comprising a table-like support adjacent which clamping means is provided for removably clamping a plurality of mold formers and to provide a flexible mold wall that can be drawn over the mold formers and given the radius of curvature required to conform to the pipe that is to be insulated. As the mold formers are removable and replaceable and the flexible mold wall can be flexed to conform to any ordinary size of former the same mold may be used for all sizes by merely replacing the mold formers to conform to any given size or shape. In this manner, only a relatively small number of mold formers need be made and kept on hand to enable the mold to be adjusted to shape the lagging to fit all pipe sizes.

With the foregoing and other objects in view, which will be made manifest in the following detailed description and specifically pointed out in the appended claims, reference is had to the accompanying drawings for an illustrative embodiment of the invention, wherein:

Figure 1 is a top plan view of the improved variable mold embodying the present invention, parts being broken away;

Fig. 2 is a front view in elevation of the improved variable mold, parts being broken away and shown in vertical section;

Fig. 3 is a transverse sectional view taken substantially upon the line 3—3 upon Fig. 2; and Figs. 4 and 5 are sectional views taken upon the lines 4—4 and 5—5, respectively, on Fig. 1.

Referring to the accompanying drawings wherein similar reference characters designate similar parts throughout, the improved mold is supported on a suitable supporting structure such as a table or bench 10. On this table or bench suitable rails 11 and 12 are secured which extend rearwardly from adjacent the forward edge of the bench. Near the forward edge there are arranged at spaced intervals opposed companion angles 13 between which are receivable semi-circular mold formers 14. The number of these mold formers employed is illustrated as being three, this being ordinarily sufficient to support the flexible mold wall 15 when ordinary lengths of lagging are used to form the semi-cylindrical insulation section. In shorter molds two of such mold formers may suffice and in longer molds more than three mold formers may be required. The mold formers 14 are duplicates of each other and have radii of curvature conforming to the external radius of the pipe to be covered. The mold formers 14 are held between the companion angles 13 such as by thumb screws 16 which enable the mold formers to be readily detached and replaced by another set of mold formers having radii of curvature conforming to the radius of another size or shape. The flexible mold wall 15 is formed of a section of flexible sheet metal having its rear end suitably anchored as at 17 between a pair of angle irons that extend between the rails 11 and 12 and which have their ends slidable in the rails as illustrated in Fig. 4. These angle irons which cooperate to form a cross bar are adjusted along the lengths of the rails 11 and 12 to position the rear end of the flexible mold wall 15 against the rear sides or edges of the mold formers 14. The flexible mold wall can then be drawn snugly around the mold formers and down across the forward edge of the table or bench 10 and maintained in this taut condition such as by a spring 18. Although the wall 15 is formed of flexible sheet metal and is supported by the mold formers at only three spaced points as illustrated in Fig. 2, the bending of the sheet metal causes a type of truss to be developed therein which is adequately strong to support the lags thereon in shaping the semi-cylindrical lagging section. A section of fabric indicated at 19 may also be fastened to the cross bar formed by the angle irons 17. This section of fabric is adapted to be moistened with water and drawn about the flexible mold wall 15 so as to overlie it. Another angle iron indicated at 20 extends between the rails 11 and 12 and is disposed rearwardly of the cross bar 17. This angle iron is slidable on the rails and is adapted to be moved toward the cross bar 17 to hold the lowermost rear lag L in position against the rear side of the mold. This angle iron may be held in any adjusted position such as by thumb screws 21.

The operation and advantages of the above-described construction are as follows: If it is desired to produce lagging for a given size or shape, mold formers 14 corresponding to that size are selected and are installed between the companion angles 13 by means of the thumb screws 16. The flexible sheet metal mold wall 15 is then drawn snugly about the mold formers and maintained in this taut condition by the spring 18, thus developing a surface whose curvature corresponds to the curvature of the pipe to be insulated. The fabric 19 is moistened with water and is drawn thereover. The lags L formed of insulating material such as corkboard are then coated on their radial sides with asphaltum or similar adhesive. The first lag is positioned on the horizontal flanges of cross bars or angles 17 and 20 and succeeding lags are built up thereon. As each succeeding lag is applied to the mold wooden skewers S may be driven through an applied lag into the last previous lag that is applied to the mold. The asphaltum quickly cools and hardens binding the lags together. If desired, the use of skewers or their equivalent may be omitted but they are ordinarily preferably employed. Some of the asphaltum usually seeps from or is squeezed from between the opposed radial faces of adjacent lags. This asphaltum is kept from sticking to the mold by the water-moistened fabric. When the section has been completed by the assembly of all of the lags required for a semi-cylindrical section the entire section may be removed from the mold. The lags L will of course not ordinarily have their inner and outer faces shaped to conform to the inner and outer radii of the lagging section and after the semi-cylindrical section is formed as above-described it may be and frequently it is desirable to trim it to conform to a true semi-cylinder. For this purpose a trimming machine such as is disclosed in my copending application Serial No. 635,979 filed December 19, 1945 may be employed.

Whenever occasion requires the formation of lagging having a different radius of curvature the mold formers 14 are removed and are replaced by another set of mold formers having the required radius of curvature. The bars 17 and 20 are adjusted on the rails to adopt these mold formers which are so positioned as to be substantially flush with the forward edge of the bench. When the flexible mold wall 15 is drawn thereover any excess of this section of flexible sheet metal is merely drawn down across the forward face of the bench 10.

From the above-described construction it will be appreciated that an improved variable mold is provided for forming semi-cylindrical lagging sections and the like which is adjustable to form sections of various sizes. In making the adjustment it is merely necessary to replace the mold formers 14 to conform to the size of the particular pipe that is to be covered. Consequently, for all sizes of pipe only a limited number of mold former sets is required for use in conjunction with each variable mold.

In some instances a lagging section having an interior liner of felt is desired. When this is desired or required the felt that is to form the liner is positioned either directly against the flexible wall 15 or against the fabric positioned thereover and the lags are assembled together over the felt liner. Any asphaltum that is squeezed out from between the lags merely serves to adhesively fasten the felt liner in position on the interior of the lagging section.

Various changes may be made in the details of construction without departing from the spirit and scope of the invention as defined by the appended claims.

I claim:

1. A variable mold for forming semi-cylindrical sections of insulation and the like comprising means providing a pair of spaced rails, means for removably holding a plurality of mold formers in alignment between the rails, a flexible mold wall, means for adjusting one edge of the mold wall along the lengths of the rails, said flexible mold wall being adapted to be drawn over the mold formers, means for holding the flexible mold wall in drawn position, and a cross bar slidable on the rails for holding a lag against the back of the flexible mold wall.

2. A variable mold for forming semi-cylindrical objects comprising a plurality of clamps each of which is adapted to receive and hold a semi-circular mold former, replaceable mold formers receivable therein and adapted to be held thereby in alignment, a flexible mold wall, means for holding one edge of the wall for adjustment toward and away from the clamps so that the mentioned edge may be positioned against one side of each of the mold formers and the wall may be drawn about the semi-circular edges of the mold formers to form a semi-cylinder of variable size depending upon the size of the mold formers employed and over which the material used to form the objects may be positioned.

3. A variable mold for forming semi-cylindrical objects comprising a plurality of clamps each of which is adapted to receive and hold a semi-circular mold former, replaceable mold formers receivable therein and adapted to be held thereby in alignment, a flexible mold wall, means for holding one edge of the wall for adjustment toward and away from the clamps so that the mentioned edge may be positioned against one side of each of the mold formers and the wall may be drawn about the semi-circular edges of the mold formers to form a semi-cylinder of variable size depending upon the size of the mold formers employed and over which the material used to form the objects may be positioned, and means for holding the mold wall taut about the mold formers.

VINCENT WILLIAM YOST.

REFERENCES CITED

The following references are of record in the file of this patent:

UNITED STATES PATENTS

| Number | Name | Date |
|---|---|---|
| 879,662 | Morris | Feb. 18, 1908 |
| 1,087,806 | Miller | Feb. 17, 1914 |
| 1,171,316 | Camblin | Feb. 8, 1916 |
| 1,608,242 | Sava | Nov. 23, 1926 |
| 1,737,885 | Hirschman | Dec. 3, 1929 |